United States Patent [19]

Olsen

[11] 4,456,797
[45] Jun. 26, 1984

[54] SUBMERSIBLE PERSONAL STEREO SYSTEM

[76] Inventor: Eric E. Olsen, 3460 N. Dousman St., Milwaukee, 53212

[21] Appl. No.: 421,813

[22] Filed: Nov. 18, 1982

[51] Int. Cl.³ .............................................. H04R 1/44
[52] U.S. Cl. ....................... 179/156 R; 179/115.5 BS; 179/107 E; 179/182 R; 367/132; 381/88
[58] Field of Search ............... 179/107 E, 156 R, 157, 179/182 R, 182 A, 184, 186, 115.5 BS; 367/132, 131; 381/69, 88, 90

[56] References Cited

U.S. PATENT DOCUMENTS 3,134,861  5/1964  Dempsey et al. ............... 179/156 R

FOREIGN PATENT DOCUMENTS 8102738  8/1981  United Kingdom ............ 179/156 R

OTHER PUBLICATIONS

H. Webb et al., "An Underwater Audio Communicator", 1966, IEEE International Convention, pp. 133-143.
Goedecke and Co., "Water Sound", Instructions For Use Of Commercial Product.

Primary Examiner—G. Z. Rubinson
Assistant Examiner—James L. Dwyer
Attorney, Agent, or Firm—Quarles & Brady

[57] ABSTRACT

A waterproof pouch to house a personal stereo cassette tape player or radio electrically connected by means of a retractile cable to a pair of waterproof headphones. The waterproof pouch has a closure enabling the pouch to repeatedly be hermetically sealed and reopened. A tubular belt loop is attached to one side of the pouch and secures a belt and buckle combination which fastens around the user's waist. A connector permanently and hermetically secures the electrical cable extending from the exterior to the interior of the pouch. The electrical cable in a coiled retractile form extends from the connector and splits into a Y-shape with both legs electrically attached to the waterproof headphones. Both waterproof headphones consist of a rigid disc with a waterproof earphone mounted on one side and a bracket mounted on the opposite side such that an elastic headband extends through the bracket. The headband is adjustable in length and secures the headphones to the user's head. Both waterproof earphones have pliable sleeves which form a hermetic seal with the user's ear canal to prevent water from entering the ear canal and disrupting the audio program heard by the user. A thin plastic membrane is positioned behind the diaphragm of the earphone to waterproof the earphone when not positioined in the user's canal. This invention enables the user to listen to a high fidelity stereo audio program while active in the water.

4 Claims, 7 Drawing Figures

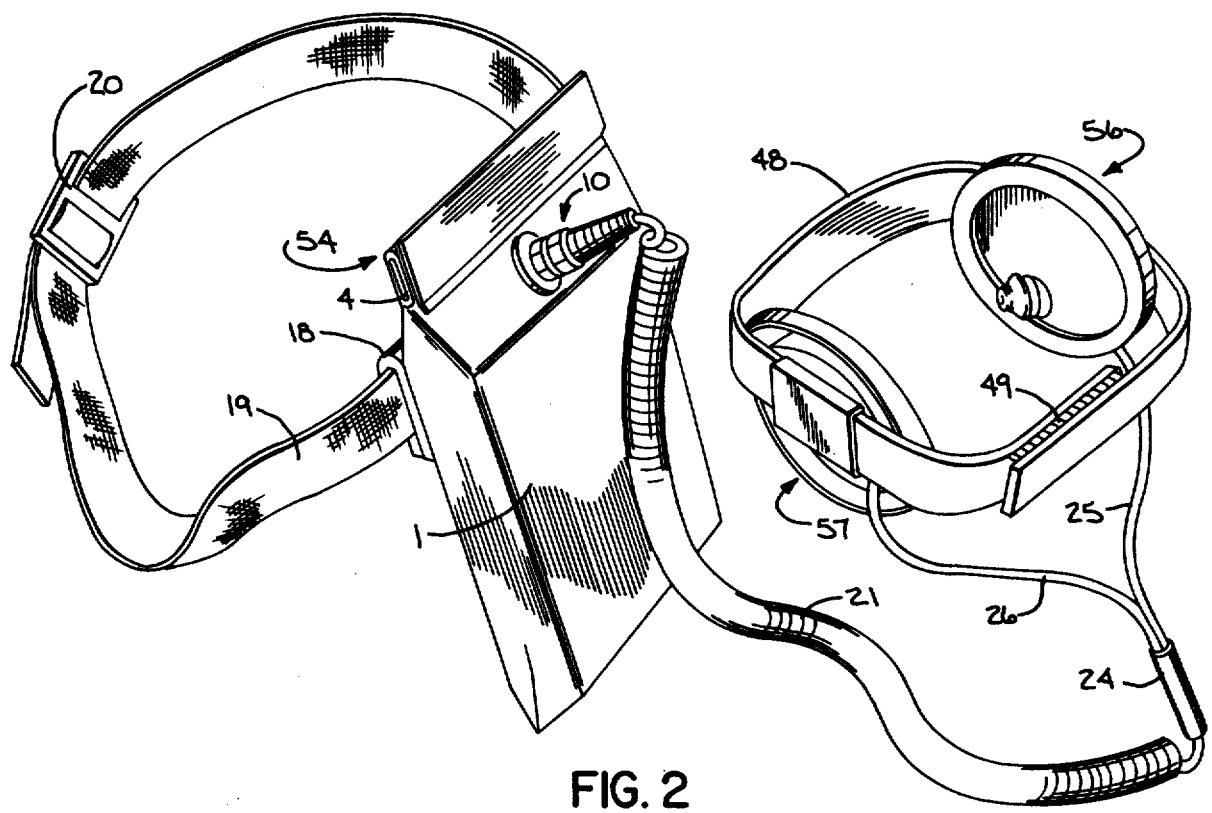
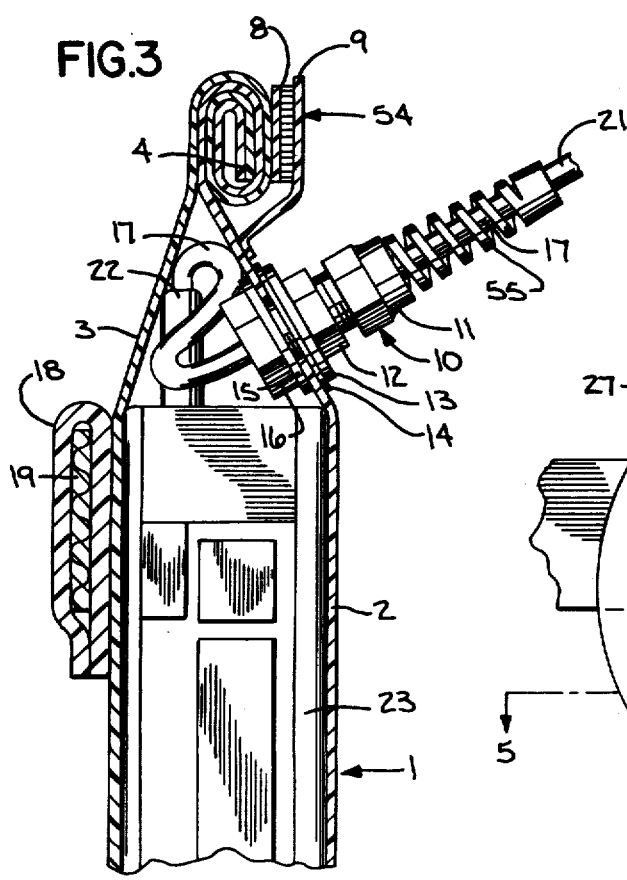
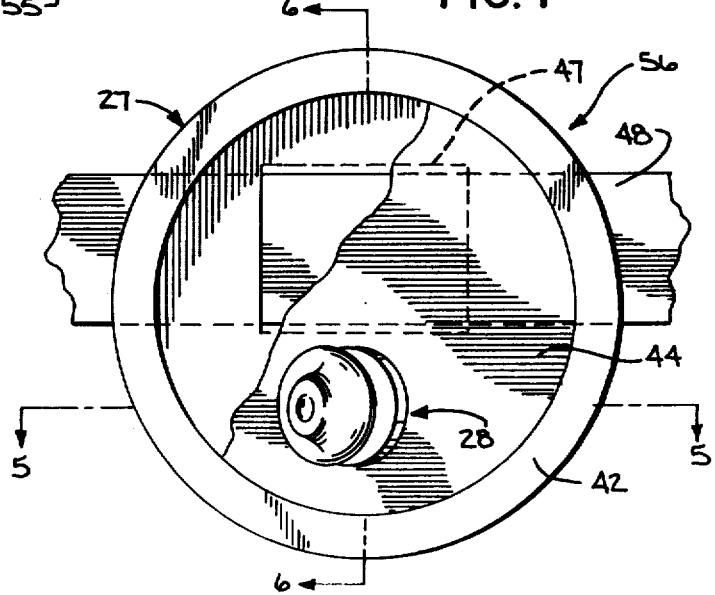

SUBMERSIBLE PERSONAL STEREO SYSTEM

Field of Invention

This invention relates to personal stereo systems and specifically their use in water.

Discussion of Prior Art

Heretofore personal stereo devices, such as personal cassette tape players and radios, could not be used in the water as water entering such devices would destroy them and any attached conventional headphones.

A device invented by Goedecke & Co. GmbH in West Germany with a West German patent pending provides a flexible waterproof housing for a personal stereo device and a separate flexible waterproof housing for conventional headphones. A disadvantage to this device is that water can readily enter the user's ear canals, a usual occurrence after the user's head is submerged, and block out virtually all sound from the headphones to the user's eardrums. The user thereby hears only intermittent sound from the headphones. A further disadvantage is that the flexible housing between the conventional headphones and the user's eardrums severely diminishes the fidelity and volume of the sound heard by the user. A further disadvantage is that the conventional headphones in this flexible, waterproof housing are loosely secured to the user's head so water moving past the user's head, as occurs in swimming, readily removes the headphonesfrom the user's head. A still further disadvantage of the Goedecke & Co. invention is the considerable time and effort required to assemble the waterproof connection between the flexible waterproof housing and the cord of the conventional headphones, and to secure the conventional headphones into their waterproof housing. Removal and reentry of the conventional headphones into the waterproof housing also impairs the integrity of the waterproof seal on the housing. This weakness leads Goedecke & Co. to recommend the user leave one set of conventional headphones permanently in the waterproof housing and purchase another set of conventional headphones for use in dry environments, yet another disadvantage to the user. A still further disadvantage is that most conventional headphones have a straight cable attached. The slack in a straight cable can impair the user's movement while active in water.

Objects

Accordingly, several objects of my invention are a flexible waterproof housing for personal stereo devices including a retractile cable permanently linking the waterproof housing and waterproof headphones. The waterproof headphones of my invention require no flexible waterproof housing and have pliable rubber sleeves which form a hermetically sealed air passageway between the sound generating diaphragm of the headphone and the user's ear canals. Water does not enter the user's ear canals. The user hears a continuous program of high fidelity stereo sound even when the user is completely submerged in water. The earphone portion of the headphone is hermetically sealed on the side opposite the sound generating diaphragm and a thin plastic membrane is located between the diaphragm and its housing making the earphone waterproof even when not on the user's head. The waterproof headphones are firmly secured to the user's head by means of an elastic closed cell neoprene headband. The headband is readily adjustable in length by means of a Velcro strip located on each end of the headband. The headband enables the headphones to stay correctly positioned on the user's head even with an intense flow of water past the user's head. A retractile cable permanently links the waterproof housing and the waterproof headphones thus eliminating the inconvenience of assembling and disassembling the connection between cable and housing. The user does not commit a set of conventional headphones. The electrical cable on my invention is coiled retractile cable eliminating virtually all slack yet permitting the user extensive body movement without impairment by the cable.

Further objects and advantages of my invention will become apparent from a consideration of the drawings and ensuing description thereof.

Drawings

FIG. 2 is a perspective view of the device.

FIG. 3 is a fragmentary sectional view taken along line 3—3 of FIG. 2

FIG. 4 is an elevational view of one earphone.

Description

Figure 1:
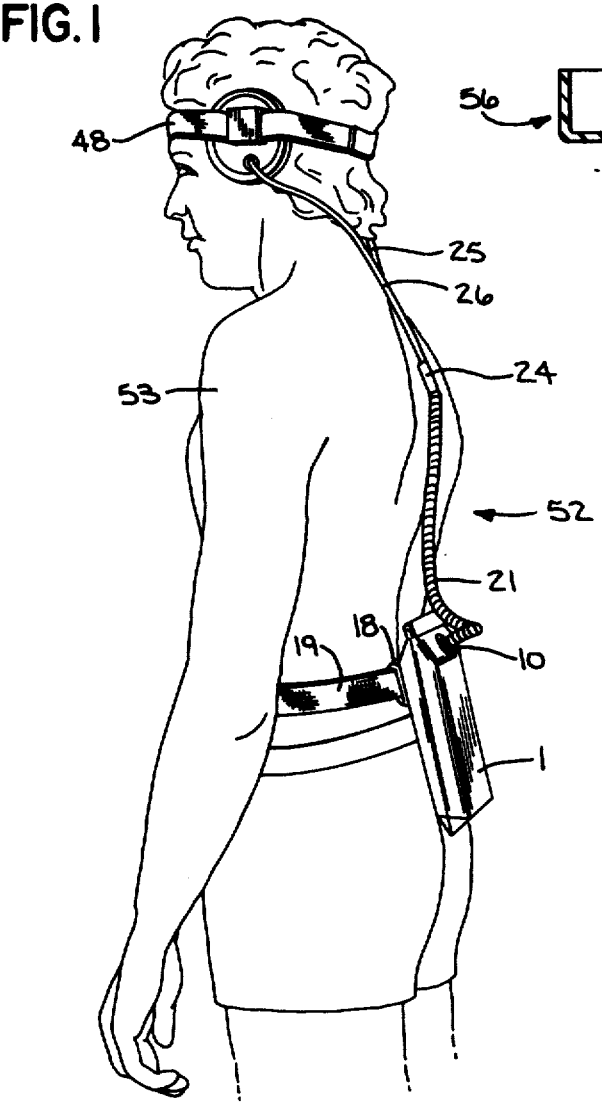
FIG. 1 is a view of the apparatus being worn by a swimmer.

Referring now to the drawings, an apparatus 52 is provided for a user such as the swimmer 53 illustrated in FIG. 1 to listen to a stereo audio program while in water. Apparatus 52 includes a waterproof pouch 1 preferably made of vinyl or similar flexible water-proof material. A personal stereo device 23 such as a radio or cassette tape player is inserted into the pouch through the open end 4 (see FIG. 3). Open end 4 of the pouch 1 can repeatedly be hermetically sealed and reopened by means of a closure 54 provided by Velcro Fastener Systems, New York, NY. Closure 54 consists of three sequential folds of the open end 4 secured by a strip 8 of Velcro material attached to pouch surface 3 meshing with strip 9 of Velcro material attached to pouch surface 2. A tube 18 open at both ends and made of closed cell neoprene is adhered to pouch surface 3 such that the longitudinal axis of tube 18 is positioned parallel to the width of surface 3. Tube 18 serves as a belt loop through which belt 19 passes. Belt 19 encircles the user's waist and is secured by adjustable buckle 20. Belt 19 and buckle 20 are made of nonwater-soluble and rustproof materials.

A three conductor electrical cable 17 is hermetically and permanently secured through a hole in pouch surface 2 immediately below Velcro strip 9 by means of connector 10 (see FIG. 3). Cable 17 is hermetically secured to connector 10 by means of a rubber O-ring compressed and retained around cable 17 by cone shaped nut 11 threaded onto the outer end of connector 10. Nut 11 may have a coiled strain relief 55 extending approximately one inch around cable 17 as illustrated in FIG. 3. Connector 10 is hermetically secured through pouch surface 2 by means of a nut 16 threaded onto the end of connector 10 protruding into pouch 1. Polyethylene washer 15 is positioned around connector 10 between the interior of pouch surface 2 and nut 16. Neoprene washer 14 is positioned around connector 10 and between exterior of pouch surface 2 and polyethylene washer 13. Polyethylene washer 13 is positioned around connector 10 and between neoprene washer 4 and hex flange 12. Cable 17 extends into pouch 1 and is electrically attached to 3.5 mm stereo plug 22. One conductor of cable 17 connects to one program terminal of the stereo plug 22 and another conductor of cable 17 connects to the other program terminal of the stereo plug 22. The remaining conductor of cable 17 connects to the common ground terminal of stereo plug 22. Stereo electrical connections are standard to those familiar with the art and are not illustrated. Stereo plug 22 is inserted into the headphone jack on stereo device 23. The portion of cable 17 external to pouch 1 and connector 10 is coiled retractile cable 21 (see FIG. 2) with a retracted length of approximately eight to twelve inches and an extended length of approximately six feet. The end of retractile cable 21 opposite connector 10 has a Y-shaped split 24 with leg 26 and leg 25 each having one conductor carrying one side of the stereo program and a common ground conductor. Leg 25 has a waterproof jacket and is attached electrically to right headphone 56. Leg 26 has a waterproof jacket and is attached electrically to left headphone 57.

Right headphone 56 is a mirror image of left headphone 57.

Figure 5:
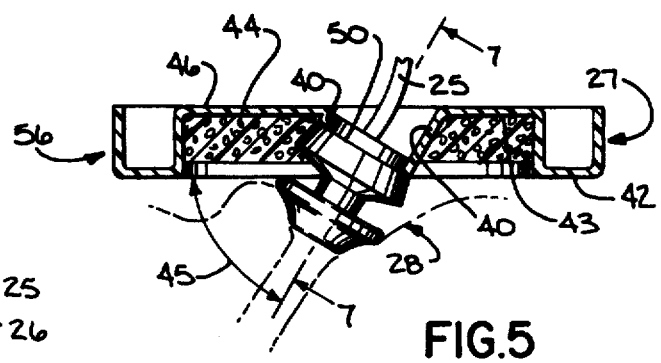
FIG. 5 is a sectional view taken along line 5—5 of FIG. 4.
Figure 6:
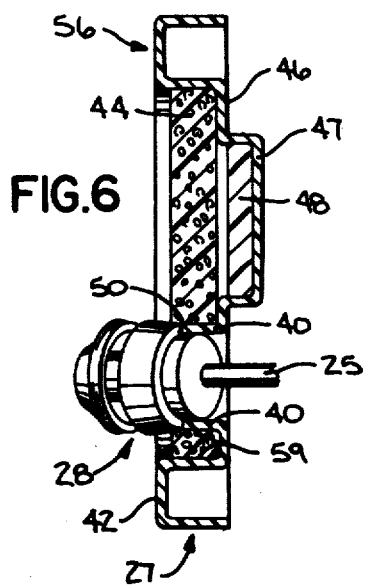
FIG. 6 is a sectional view taken along line 6—6 of FIG. 4.
Figure 7:
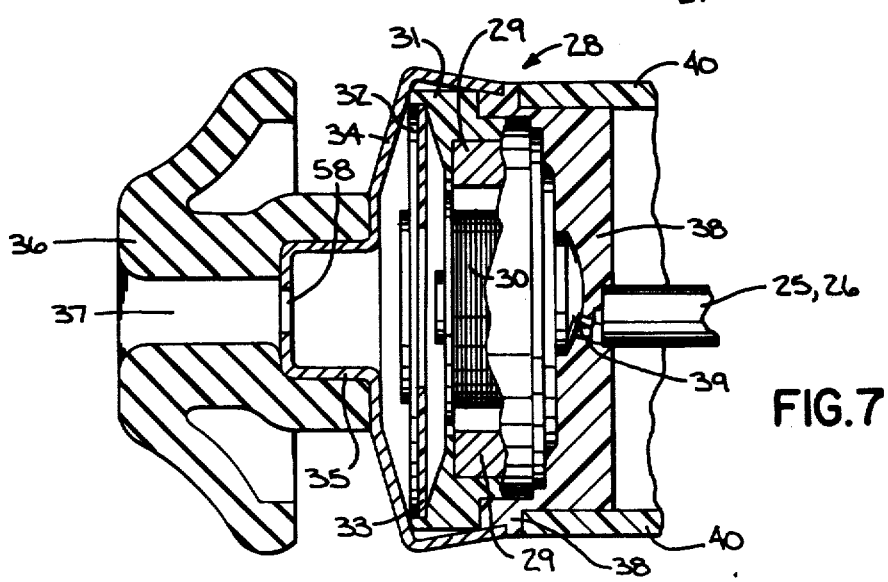
FIG. 7 is a sectional view taken along line 7—7 of FIG. 5.

As best illustrated in FIGS. 4,5,6, each headphone consists of a waterproof earphone 28 mounted on the recessed surface 43 of a rigid disc 27 and a headband bracket 47 extending from surface 46. A closed cell neoprene pad 44 adhered to surface 43 occupies the recessed volume of the disc not occupied by the earphone 28 and its mount 40. Referring to FIG. 7, earphone 28 generates sound by means of an electromagnetic coil 30 and O-shaped permanent magnet 29 driving a ferrous metal diaphragm 32 in accordance with the modulating electrical current flowing through the coil 30. Such an arrangement is common knowledge to those familiar with the art. Coil 30 is encircled by magnet 29. Magnet 29 is housed within plastic collar 31. Diaphragm 32 seats into one end of collar 31 and is concentric with the coil 30 and magnet 29. A thin, flexible plastic membrane 33 is located between the diaphragm 32 and the collar 31. Diaphragm 32 is retained in position by magnetic force from the magnet 29. Diaphragm 32 in turn retains membrane 33 in position. Two electrical terminals 39 are located on the end of collar 32 opposite diaphragm 32 and are electrically attached by solder to the two respective conductors in leg 25 or leg 26. A metallic outer housing 34 encloses over the diaphragm 32 and perimeter edge of collar 31. A circular opening 58 is located in the end of a sleeve 35 extending from the side of the housing 34 opposite the collar 31. The smaller end of a mushroom shaped, pliable rubber sleeve 36 is hermetically adhered in position around the housing sleeve 35. The open longitudinal center 37 of the rubber sleeve 36 is concentric with opening 58 thus forming a clear air space between diaphragm 32 and the open end of rubber sleeve 36 opposite housing sleeve 35. The joint between housing 34 and collar 31 is hermetically sealed with epoxy cement 38. The terminals 39 and the end of the collar 31 on which the terminal 39 are located are hermetically coated with epoxy cement 38.

Referring to FIGS. 5,6, earphone mount 40 protrudes from surface 43. Collar 31 seats on mount 40 at edge 50 and is secured with epoxy cement. Edge 50 is at an approximately 60-degree angle 45 to surface 43 so axis 7—7 aligns with the longitudinal axis of the user's ear canal.

Referring to FIGS. 4,6, mount 40 is positioned such that the closest distance between mount 40 and the inside wall 59 of the raised perimeter 42 is approximately one-quarter inch. A bracket 47 open at two ends protrudes from surface 46. The longitudinal axis of bracket 47 is parallel to axis 5—5 and intersects axis 6—6 at a point approximately one-third from the top of axis 6—6. A closed cell neoprene headband 48 passes through bracket 47 on right headphone 56 and left headphone 57. Each end of headband 48 has a strip 49 of Velcro material (see FIG. 2) adhered to it enabling the length of the headband 48 to be adjusted.

Operation

User inserts a personal stereo device 23 into pouch 1 and inserts stereo plug 22 into headphone jack of stereo device. Stereo audio program is conducted through cable 17, 21, leg 25, leg 26 and to the headphones 56, 57 when stereo device 23 is activated. User adjusts the sound volume of stereo device 23 while temporarily holding open end of rubber sleeve 36 in user's ear canal. Closure 54 is sealed preventing water from reaching stereo device 23. Pouch 1 containing stereo device 23 is attached to user by means of belt 19 secured around user's waist by buckle 20. Preferred position of pouch 1 is on user's buttocks and lower back (see FIG. 1). User can activate or deactivate stereo device 23 by manipulating appropriate switch on stereo device through the flexible walls of pouch 1. User adjusts length of headband 48 to fit snugly on user's head by varying the operlap of the Velcro strips 49 at each end of the headband 48. Left headphone 57 is positioned by means of sliding along headband 48 which slides through bracket 47 until rubber sleeve 36 is firmly inserted in the user's left ear canal. Right headphone 56 is positioned in the same manner relative to the user's right ear canal. Both headphones 56, 57 are secured on the user's head by the elasticity of the closed cell neoprene headband 48. The expanded end of rubber sleeve 36 forms a hermetic seal against the wall of the user's ear canals preventing water from entering the clear air space between the user's eardrum and diaphragm 32. Membrane 33 prevents water from reaching coil 30 and magnet 29 in the event that water should enter rubber sleeve opening 37 and housing opening 58 as may happen if headphones are submerged while not in position on user's head. The epoxy cement 38 seals the side of the earphone 28 opposite the user's head from water entering earphone 28. Pad 44 cushions the user's ear against the rigid disc 27. The retractile portion of the cable 21 enables the user to move in virtually any manner without impairment by the cable 21.

While the above description contains many specificities, these should not be construed as limitations on the scope of the invention, but rather as an exemplification of one preferred embodiment thereof. Many other variations are possible, for example: connector 10 may incorporate a heat shrink sleeve around cable 17 instead of the pressure fit O-ring in nut 11 as a means of hermetically securing cable 17; a flexible plastic film may be adhered to the edge of pouch 1 folded to form closure 54 as a means of reinforcing this stressed edge; earphone 28 may be adhered directly to surface 43 without the use of mount 40; strain relief 55 may be eliminated.

Accordingly, the scope of the invention should be determined not by the embodiment illustrated, but by the appended claims and their legal equivalents.

What is claimed is:

1. A personal stereo system for use by swimmers comprising a pouch of flexible waterproof material for containing a personal stereo device such as a radio or cassette tape player, said pouch having an open top for receiving the personal stereo device, means for sealing said top, means for securing said pouch to a belt, an electrical cable hermetically sealed at one end to said pouch, and waterproof earphones operatively attached to the other end of said cable, said waterproof earphones each including a hermetically sealed housing containing the operative components of the earphone including a sound generating diaphragm and an outwardly extending pliable sleeve which is hermetically sealed at one end to the housing, the other end of said pliable sleeve being open and available to form a hermetic seal with the ear canal of a user so that water is prevented from entering the ear canal and interfering with the sound heard by the user.

2. The system of claim 1 in which the earphone includes a membrane positioned behind the diaphragm of the earphone.

3. The system of claim 1 in which each of the earphones includes a rigid support member which has a bracket for mounting to an elastic headband.

4. A waterproof earphone for use with a personal stereo system, said earphone comprising a hermetically sealed housing containing the operative components of the earphone including a sound generating diaphragm and an outwardly extending pliable sleeve, said sleeve being hermetically sealed at one end to the housing for transmitting sound from the diaphragm through the sleeve, the other end of said sleeve being open and available to form a hermetic seal with the ear canal of a user.

* * * * *